United States Patent [19]

Romine et al.

[11] Patent Number: 4,557,684

[45] Date of Patent: Dec. 10, 1985

[54] BENDER FOR SYNTHETIC RESIN PRINTING PLATES

[75] Inventors: Gary L. Romine; Woodrow W. Pendleton; Daniel D. Dillinger, all of Emporia, Kans.

[73] Assignee: Didde Graphic Systems Corporation, Emporia, Kans.

[21] Appl. No.: 657,608

[22] Filed: Oct. 4, 1984

[51] Int. Cl.⁴ .......................... B29C 17/02; B29F 5/00
[52] U.S. Cl. ...................... 425/383; 72/319; 264/339
[58] Field of Search ............... 264/339; 425/383, 400, 425/403; 72/319

[56] References Cited

U.S. PATENT DOCUMENTS

| | | | |
|---|---|---|---|
| 1,872,482 | 8/1932 | Messing | 264/339 |
| 2,648,370 | 8/1953 | Beach | 264/339 |
| 2,739,636 | 3/1956 | Tyler | 264/339 |
| 2,744,850 | 5/1956 | Schofield | 264/339 |
| 3,914,974 | 10/1975 | DeVore | 72/319 |
| 3,948,074 | 4/1976 | Stalzer | 72/319 |
| 4,210,007 | 7/1980 | Michel | 72/319 |
| 4,365,500 | 12/1982 | Kiukow | 72/319 |

Primary Examiner—Willard E. Hoag
Attorney, Agent, or Firm—Schmidt, Johnson, Hovey & Williams

[57] ABSTRACT

A bender for plastic printing plates locates the line of fold from the leading edge of the plate by providing positioning means adjacent the die surface. The printing plate is placed on a flat base and adjusted to engage the positioning means, the latter in alignment relative to the die. Next, a guide means lifts an edge segment of the plate into a position for engagement by a channel carried by the die. As the die swingably moves through an arc, the edge segment is reversely folded back and into contact with an adjacent area of the sheet while forming a crease sufficient to overcome a substantial part of the memory of the sheet along the line of fold. Consequently, plate image will be precisely parallel to the line of fold, thereby minimizing setup time. Also, plates of various lengths may be bent without adjusting the bender.

10 Claims, 9 Drawing Figures

BENDER FOR SYNTHETIC RESIN PRINTING PLATES

BACKGROUND OF THE INVENTION

1. Field of the Invention

The present invention relates to a device for bending plastic printing plates in preparation for mounting the plate on an offset press.

2. Description of the Prior Art

The rapid growth in the use of offset lithography is due, in large part, to the speed and low cost of making the image carrier or plate, which is used for printing the multiple copies on the press. In recent years, the evolution of photodirect image plates has accelerated this growth. These plates are actually the film used in lithographic cameras to photograph the original material or copy. Unexposed areas on the plate are dissolved in water or a solvent, leaving the exposed portion as an ink-receptive image area or stencil.

The developed plate is mounted to a plate cylinder on the press. In use, the cylinder rotates, engaging the plate against a dampening roller to wet the plate, so that the non-printing areas on the plate will repel the ink. Next, the plate contacts an inking roller which transfers ink to the receptive image areas. Subsequently, the image is transferred from the plate to a rubber blanket cylinder, which finally transfers the image to the paper stock.

Consequently, the alignment of the image on the plate relative to the plate cylinder is highly important to insure that the final printed image is transferred to a correct position on the paper. Typically, the plate is fixed to the cylinder by bending an edge segment of the plate and installing the bent segment into a peripheral slot on the cylinder. The line of the bend is related to the leading edge of the image which is the first portion of the plate to contact the blanket cylinder. The opposite, trailing end of the plate is wrapped around the plate cylinder and also installed in the slot adjacent the leading edge.

As a result, the lead edge bend of the plate must be accurately positioned relative to the image on the plate. Metal printing plates are bent by common sheet metal bending tools having positioning means engageable with the leading edge of the plate. However, plastic printing plates are very resilient, have a significant memory, and cannot be permanently bent using ordinary bending apparatus for metal plates. In contrast to metal plates, plastic plates must be forcefully crimped by reversely folding the edge segment about an arc and into contact with an adjacent area of the sheet. Subsequently, a die must be used to permanently crease the sheet adjacent the fold, in order to overcome a substantial part of the memory of the sheet along the line of fold.

Previously, plastic plate benders have utilized a flat base having a positioning means, or stop engageable with the trailing edge of the sheet. A swingable die was then moved to engage the leading edge, and would continue to move to reversely fold and crimp the leading edge segment to achieve the bend. Unfortunately, while the stop used on these bending devices engaged the sheet at its trailing edge, the plate image had been previously aligned relative to the leading edge. Thus, if the trailing edge of the sheet was not precisely parallel with the leading edge, the final printed image would be askew on the paper stock.

Furthermore, such prior art benders necessarily restricted the use of plates of varying lengths, since the stops must engage the trailing edge of the sheet. Benders having adjustable stops required a time-consuming changeover, and the use of such adjustable stops often compounded alignment errors. Alternatively, the user could purchase a bender for each plate size. Obviously, there has long been a desired need in the art for a plastic plate bender which utilizes the leading edge of the sheet to locate the position of the bend.

SUMMARY OF THE INVENTION

The present invention overcomes, to a large degree, the disadvantages of the prior art. The plastic plate bender can accurately crease, without adjustment, printing plates of various sizes. Additionally, the axis of the fold is aligned with the leading edge, and not the trailing edge, of the sheet.

More specifically, our bender has a swingable former bar which carries a stop engageable with the leading edge of the plate. Initially, the plate is placed on a flat surfaced base and adjusted to engage the stop. Next, a clamp securely fixes a portion of the sheet to the base. A swingable guide means then lifts the leading edge of the plate to a position spaced above the stop. Next, the former bar is rotated and the leading edge of the plate engages a channel on the former bar. Finally, the bend is completed as the former bar continues to rotate and crease the sheet. A cam on the former bar presses against the guide means as the former bar is rotated and moves the guide means back to its initial retracted position below the base.

Also, adjustment means are provided to obtain the desired dimension of the folded edge segment. Subsequently, plates of various lengths may be bent while retaining identical folded segment widths.

Consequently, plate image disposition relative to the axis of the fold will be highly accurate because the leading edge of the plate is used to align the sheet to the crimping means. Plate length and edge parallelism are not factors in determining image to fold axis tolerance. Furthermore, the operator is freed from resetting the plate bender for sheets of different size, thereby minimizing setup time for the press.

DRAWINGS

DETAILED DESCRIPTION

Figure 1:
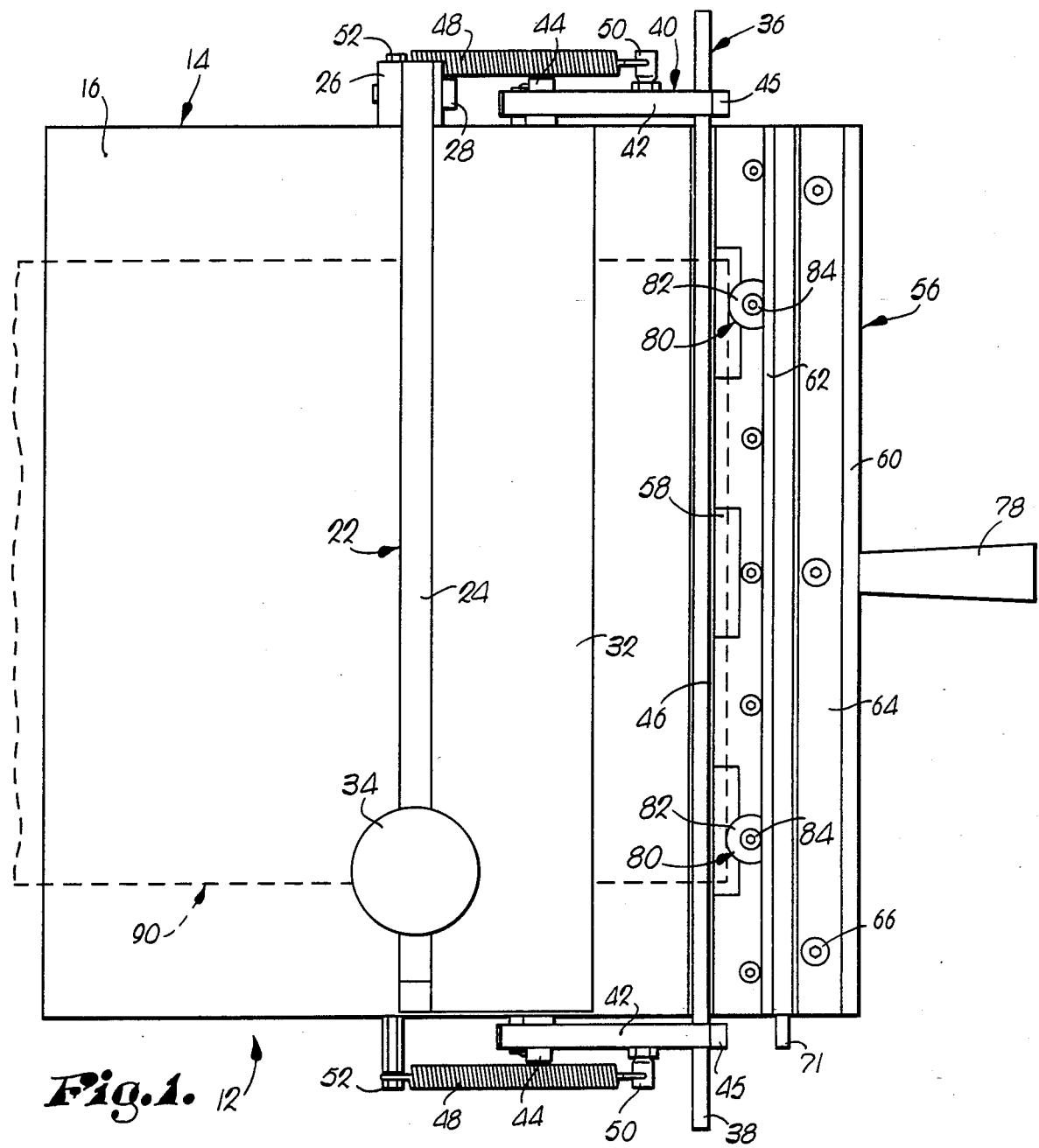
FIG. 1 is a top plan view of the plastic plate bender made in accordance with the present invention.
Figure 2:
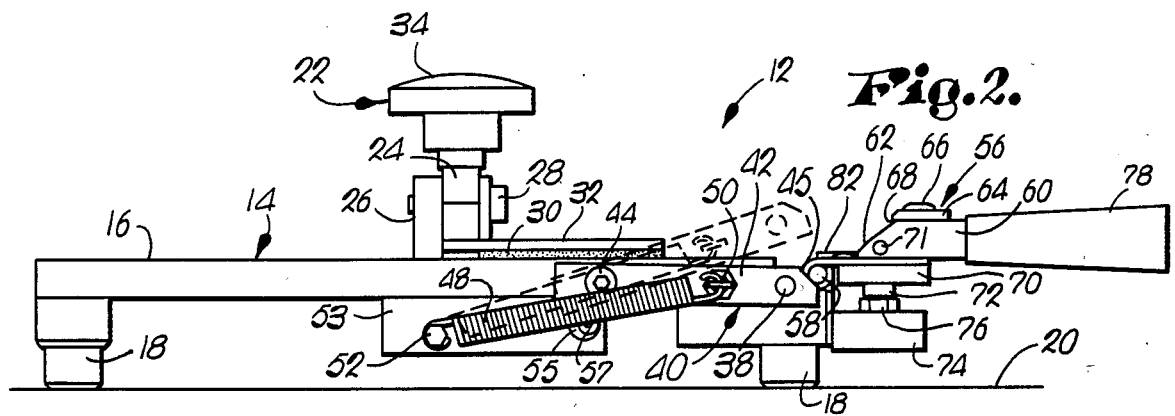
FIG. 2 is a side elevational view of the bender in FIG. 1.

The bender for synthetic resin printing plates in its preferred embodiment is shown essentially in FIG. 1 and broadly designated by the numeral 12. The bender 12 has a rectangular base 14 with a flat horizontal surface 16. Four upright legs 18 support the base 14 on a table 20 or other suitable flat surface.

A clamping means 22 comprises a lever 24 pivotally connected to a side piece 26 by means of a bolt 28 attached therethrough, the side piece 26 fixed to one side of the base 14. A resilient clamp pad 30 is attached to a rectangular support 32, the latter mounted along one edge of the lever 24. A handle 34 is attached to the lever 24 remote from the support 32.

A guide means 36 comprises a rod 38 and linkage 40 coupling the rod 38 to the base 14. The linkage 40 comprises a pair of spaced, elongated arms 42 coupling the rod 38, and also comprises pivot means 44 remote from the rod 38 connecting each of the arms 42 to the base 14. Also, each of the arms 42 has a chamfered camming surface 45 on one end thereof remote from the pivot means 44. The rod is movable from a retracted disposition shown in FIG. 3 spaced below the surface 16 within a slot 46 adjacent the base 14, to a forward disposition spaced above the flat surface 16, as illustrated in FIG. 4.

A pair of elongated, overcenter springs 48 yieldably bias the rod 38 selectively either toward the retracted disposition or toward the forward disposition. One end of each of the springs 48 is connected to a stud 50 mounted on one of the arms 42 between the pivot means 44 and the rod 38. The opposite end of each of the springs 48 is attached to an anchor 52 fixed to a block 53 secured below the base 14.

A crimping means 56 is swingably carried by the base 14 by means of an elongated hinge 58. The crimping meand 56 comprises an former bar 60 having an elongated planar die surface 62. Also, a band 64 is attached to the former bar 60 by means of three screws 66, such that the band 64 projects slightly outwardly from the former bar 60 to form an elongated channel 68. A cylindrical cam 71 extends outwardly from the former bar 60.

An rectangular brace 70 is attached to a portion of the hinge 58 opposite the former bar 60. The brace 70 is engageable with a cap screw 72, the latter threadably engaging a member 74 and secured by a lock nut 76. The member 74 is mounted on one end of the base 14. Additionally, a handle 78 is fixed to one side of the former bar 60 remote from the hinge 58.

A positioning means 80 is carried by the base 14. As shown, the positioning means 80 comprises a pair of cylindrical stops 82, each affixed to the hinge 58 by a fastener 84. The stops 82 are engageable with a leading, outer edge 86 of an edge segment 88 of a resilient sheet 90 comprised of a synthetic resin material. The sheet 90 typically is mounted circumferentially on a plate cylinder 92, the edge segment 88 disposed within an elongated, peripheral slot 94 within the cylinder 92.

OPERATION

Figure 7:
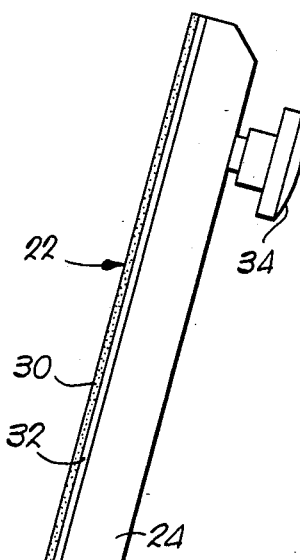
FIG. 7 is an end elevational view of the bender with the clamp lever in a raised position.
Figure 7:
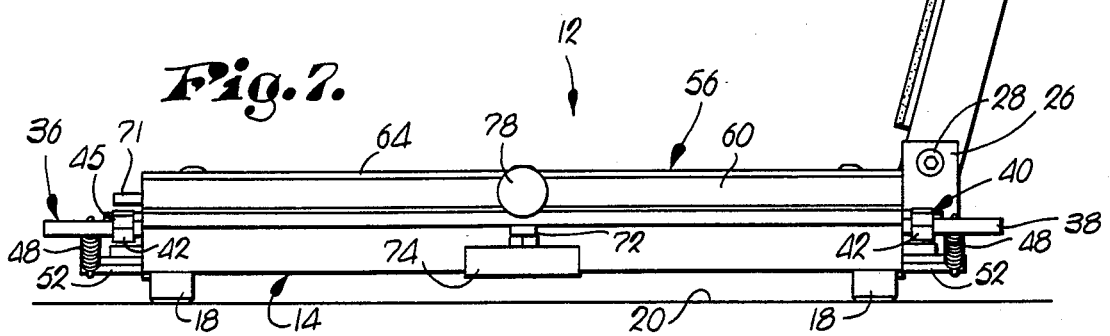

In use, the clamping means 22 is moved to a generally upright position remote from the base 14, as shown in FIG. 7. Also, the former bar 60 is swingably moved to a position wherein the brace 70 engages the cap screw 72.

The plastic sheet 90 is then placed upon the base 14 in a position such that the outer edge 86 engages the stops 82, as shown by the dashed lines in FIG. 1. In this position, the edge 86 is parallel relative to the longitudinal axis of the channel 68 of the crimping means 56, and also to the longitudinal axis of the hinge 58.

Figure 3:
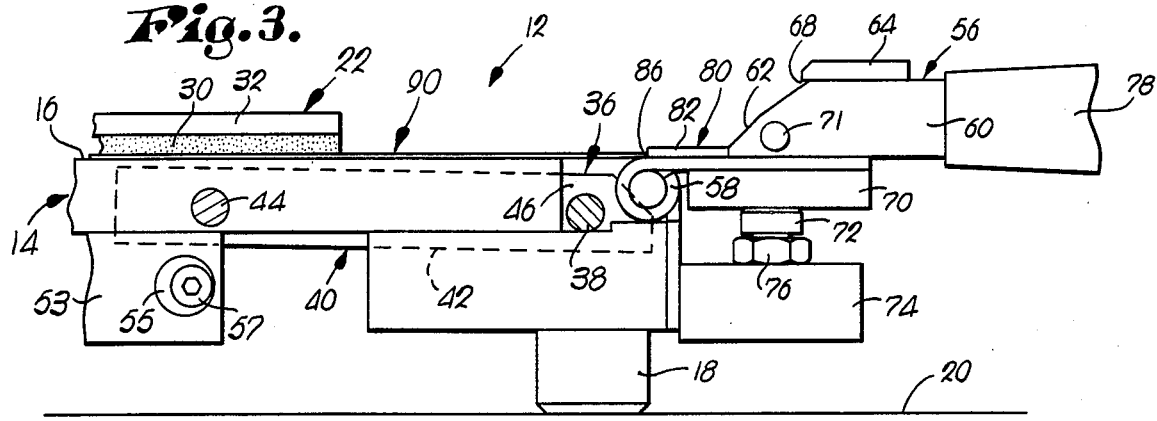
FIG. 3 is an enlarged, fragmentary, horizontal view illustrating the leading edge of the plate against the stop.
Figure 4:
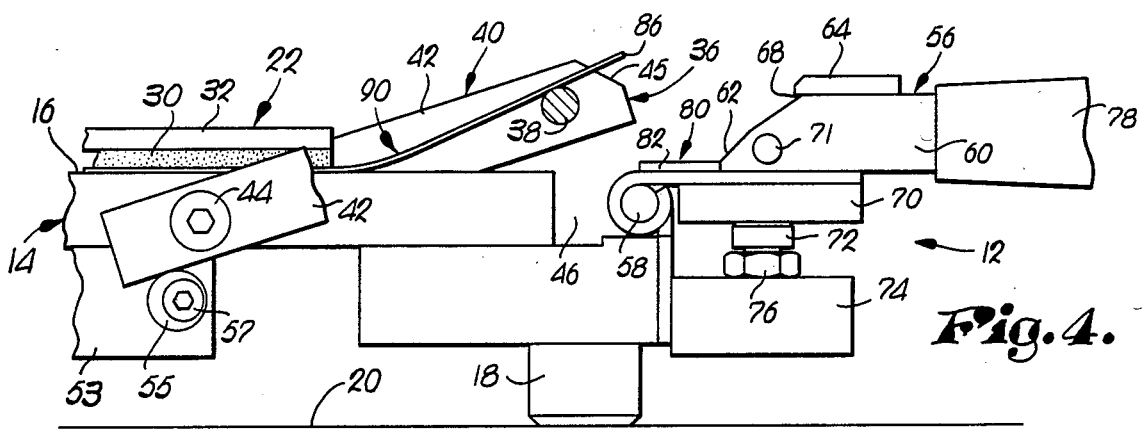
FIG. 4 is a view similar to FIG. 3 showing the repositioning of the leading edge of the plate by the guide means.

Next, the clamping means 22 is swingably moved to engage and releasably affix a portion of the sheet 90 to the base 14, with the outer edge 86 in engagement with the positioning means 80, as shown in FIG. 3.

The operator then lifts the rod 38 from a retracted disposition spaced from the sheet 90 and adjacent the base 14, to a forward disposition above the flat surface 16. As shown in FIG. 4, the rod 38 moves the outer edge 86 away from the stops 82 and toward a position to be engaged by the channel 68.

Figure 5:
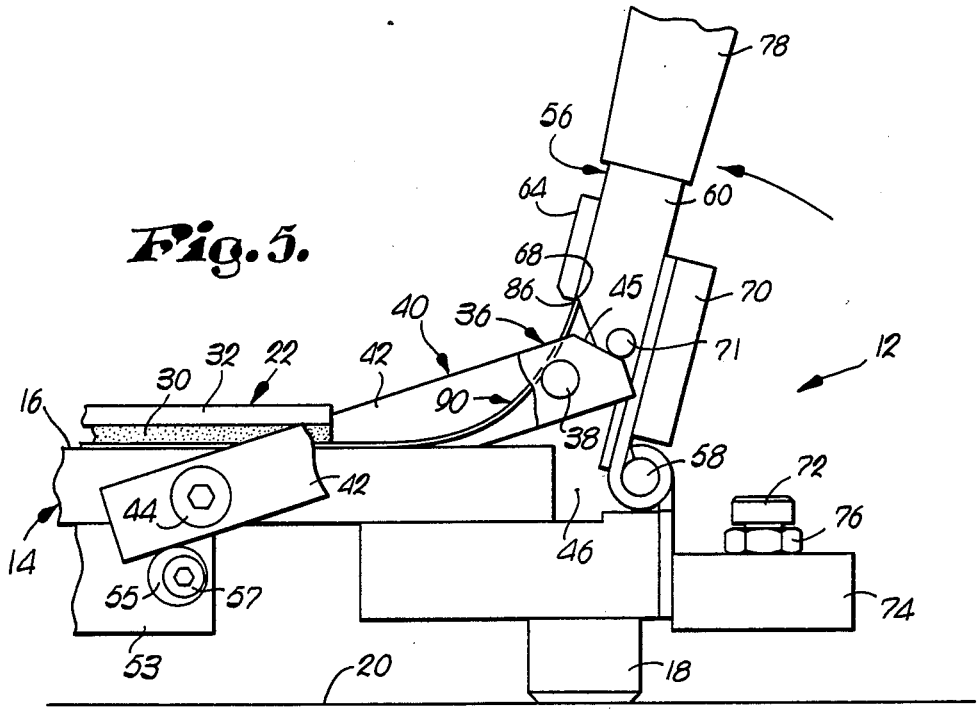
FIG. 5 is a view similar to FIG. 4 illustrating the rotation of the former bar to engage the leading edge.

Next, the handle 78 is lifted by the operator in the direction of the arrow in FIG. 5 to swing the channel 68 to a position to engage the edge 86 while the sheet 90 is supported by the base 14 and secured by the clamping means 22. The cam 71 is then in a position to engage the camming surface 45 on the arm 42.

Figure 6:
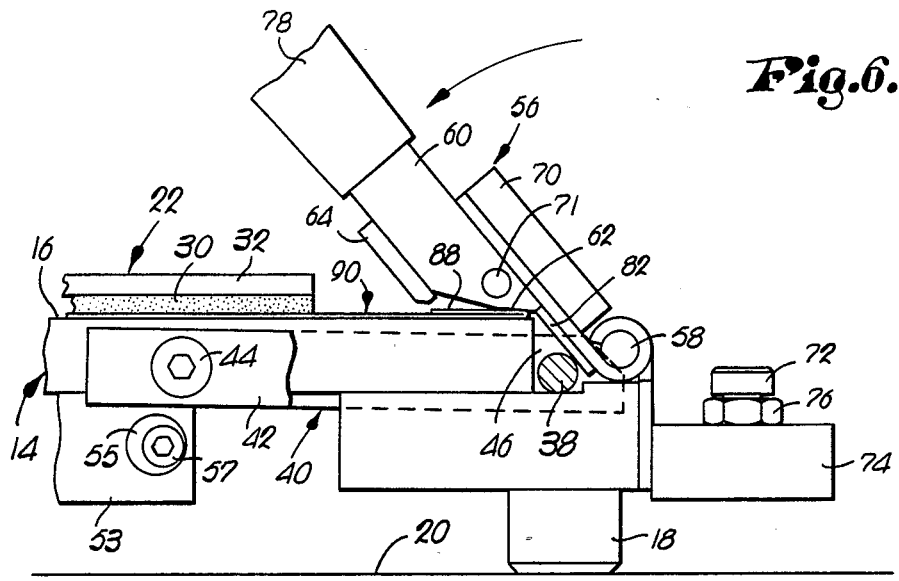
FIG. 6 is a view similar to FIG. 5 showing the creasing of the sheet by the former bar.

As the handle 78 continues to move in the direction of the arrow in FIG. 6, the crimping means 56 reversely folds the outer edge 86 about an arc and into contact with an adjacent area of the sheet 90, effecting creasing of the sheet 90 to an extent to overcome a substantial part of the memory of the sheet 90 along the line of fold of the same. As shown, the die surface 62 presses the fold against the flat surface 16 to form the crease in the sheet 90.

During swinging of the crimping means 56 to effect the crease, the cam 71 engages the camming surface 45, thus displacing the rod 38 toward the retracted disposition from the forward disposition. As the arm 42 swings downwardly, the central longitudinal axis of the overcenter spring 48 is moved to a position lower than the pivot means 44, such that the spring 48 then snaps the arm 42 downwardly toward its lower disposition, as shown by the dashed lines in FIG. 6.

Figure 8:
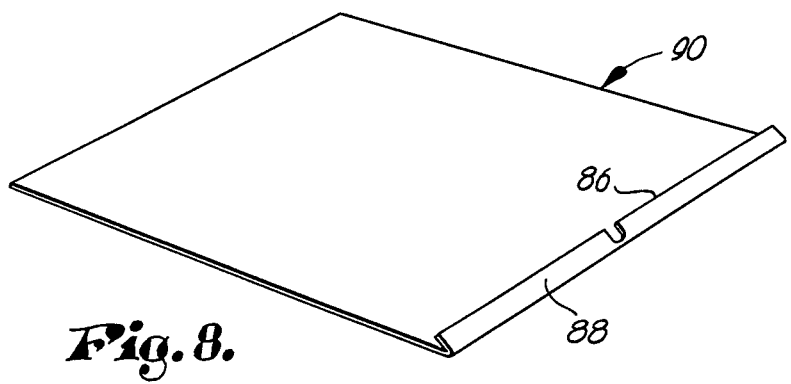
FIG. 8 is a perspective view of the bent sheet.
Figure 9:
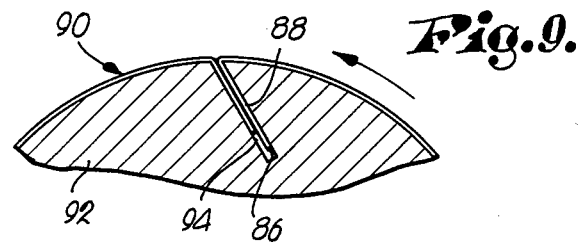
FIG. 9 is a fragmentary, sectional view illustrating the printing plate installed on the plate cylinder.

Finally, the clamping means 22 is returned to its generally upright position to release the sheet 90 from the base 14. As illustrated in FIG. 8, the sheet 90 now has a permanent crease adjacent the edge segment 88, the longitudinal axis of the crease being parallel to the outer edge 86.

Noteworthy also is the fact that the width of the edge segment 88 may be slightly varied by adjusting the cap screw 72 to any one of a number of vertical positions. The lock nut 76 releasably secures the cap screw 72 to allow selective adjustment of the latter.

Consequently, the edge segment 88 may be precisely folded in parallel relativity to the outer edge 86, since the positioning means 80 operate to align the outer edge 86 relative to the crimping means 56. Therefore, the crease will be in accurate alignment with the plate image since the plate image is aligned relative to the outer edge 86.

The trail edge of the sheet 90 need not be in precise parallelism with the leading outer edge 86, because the positioning means 80 does not engage the trailing edge. Also, plates of various lengths may be bent without any adjustment on the plate bender 12, as the trail edge of the sheet 90 can freely overhang the base 14.

Consequently, the operator need not reset the plate bender 12 for plates of different size. Each plate image will be more consistently located on the sheet 90, thus minimizing the setup time required by the operator to register plate-to-plate images on the press.

Another important aspect of the invention is the fact that the outer edge 86 is positioned against the stops 82 while the sheet 90 is in a planar configuration, and therefore the operator is able to rapidly align the sheet 90 with a high degree of precision. The sheet 90 is then firmly clamped to the base 14 before subsequent bending is commenced.

Noteworthy also is the fact that the eccentric ring 55 adjustably limits the upper path of travel of the arm 42. Thus, the rod 36 can guide outer edge 86 to a position to accurately engage the channel 68, although the operator need merely apply only enough upward force to the rod 36 to move the longitudinal axis of the spring 48 above the pivot means 44.

It is not possible to retrofit the features of this bender to those benders presently in use. The benders now in use are not efficient and require a secondary operation, after the plate is removed from the bender, to complete the bend. The plate from the applicants' bender is ready to mount when it is removed from the bender.

We claim:

1. A bender for an edge segment of a resilient sheet of synthetic resin material having significant memory, said bender comprising:

a base having a flat surface for supporting a sheet;
crimping means swingably carried by the base and engageable with said edge segment of the sheet when the sheet is supported by the base;
positioning means carried by the base and engageable with the outer edge of said edge segment of the sheet for aligning said edge relative to the crimping means; and
clamping means connected to the base and engageable with the sheet for releasably fixing a portion of the sheet to the base with said outer edge in engagement with the positioning means;
said clamping means being engageable with a portion of the sheet in a manner to releasably fix the sheet to the base during swinging of the crimping means and said crimping means being operable while said sheet is so fixed to reverse fold said edge segment about an arc ending with said segment in contact with an adjacent area of the sheet and effective to crease the sheet to an extent sufficient to overcome a substantial part of the memory of the sheet along the line of fold of the same.

2. The invention of claim 1, said crimping means including support means spaced from the surface engageable with the sheet for releasably securing the outer edge of the edge segment during swinging of the crimping means.

3. The invention of claim 2; and guide means coupled to the base and engageable with the sheet for moving said outer edge toward a position to be engaged by the support means.

4. The invention of claim 3, said support means comprising an elongated sheet edge receiving channel, and said guide means comprising a rod and linkage coupling the rod to the base, said rod having a longitudinal axis generally parallel to the longitudinal axis of the channel and being reciprocably movable to move said outer edge of the sheet away from the positioning means and toward a position to be engaged by the channel.

5. The invention of claim 4, said rod being movable from a retracted disposition spaced from the sheet and adjacent said base, to a forward disposition wherein said outer edge of the sheet is in disposition to be engaged by the channel.

6. The invention of claim 5, said linkage comprising a pair of spaced, elongated arms coupling the rod, and pivot means remote from the rod connecting each of the arms to the base.

7. The invention of claim 6; and means for displacing the rod toward the retracted disposition from the forward disposition as the crimping means folds said edge segment.

8. The invention of claim 7, said rod-displacing means comprising a cam connected to the crimping means engageable with a camming surface on the arm.

9. The invention of claim 8; and an over-center spring yieldably biasing the rod selectively either toward the retracted disposition or toward the forward disposition.

10. The invention of claim 3; said crimping means comprising a die having an elongated planar surface, and pivot means coupling the die to the base.

* * * * *